(12) United States Patent
Belikoff et al.

(10) Patent No.: US 8,245,459 B2
(45) Date of Patent: Aug. 21, 2012

(54) ROOFTOP PHOTOVOLTAIC MODULE MOUNTING SYSTEM

(75) Inventors: Michael A. Belikoff, Mendham, NJ (US); Henry B. Cabuhay, Morris Plains, NJ (US); Chris Mahn, Peoria, AZ (US); Michael J. Monaco, Stanhope, NJ (US); David Pappicco, Park Ridge, NJ (US); Mark Zeni, Branchburg, NJ (US)

(73) Assignee: First Solar, Inc, Perrysburg, OH (US)

( * ) Notice: Subject to any disclaimer, the term of this patent is extended or adjusted under 35 U.S.C. 154(b) by 26 days.

(21) Appl. No.: 12/720,519

(22) Filed: Mar. 9, 2010

(65) Prior Publication Data

US 2010/0269429 A1     Oct. 28, 2010

Related U.S. Application Data

(60) Provisional application No. 61/159,222, filed on Mar. 11, 2009.

(51) Int. Cl.
*E04D 13/18* (2006.01)

(52) U.S. Cl. ......... 52/173.3; 52/299; 126/623; 136/244; 165/48.2; 248/237; 248/910

(58) Field of Classification Search ................. 52/173.3, 52/299; 136/244; 165/48.2; 126/623; 248/237, 248/910
See application file for complete search history.

(56) References Cited

U.S. PATENT DOCUMENTS

| | | | |
|---|---|---|---|
| 1,119,232 A * | 12/1914 | Bodine | 238/30 |
| 3,505,764 A * | 4/1970 | Cagigal Gutierrez | 52/11 |
| 3,879,905 A * | 4/1975 | Catalano, Sr. | 52/23 |
| 4,226,256 A | 10/1980 | Hawley | |
| 4,506,428 A | 3/1985 | Gerhard | |
| 4,799,642 A * | 1/1989 | Wright | 248/516 |
| 5,125,608 A | 6/1992 | McMaster et al. | |
| 5,152,108 A * | 10/1992 | Madl, Jr. | 52/126.1 |
| 5,762,720 A * | 6/1998 | Hanoka et al. | 136/251 |
| 5,887,831 A * | 3/1999 | Post | 248/49 |
| 6,205,719 B1 * | 3/2001 | Bruce | 52/147 |
| 6,414,237 B1 * | 7/2002 | Boer | 136/251 |
| 6,550,199 B2 * | 4/2003 | Phillips | 52/294 |
| 6,559,371 B2 * | 5/2003 | Shingleton et al. | 136/246 |
| 6,601,363 B2 * | 8/2003 | Richard | 52/741.15 |
| 6,722,357 B2 * | 4/2004 | Shingleton | 126/600 |
| 7,755,562 B2 * | 7/2010 | Runte | 343/874 |
| 7,807,918 B2 * | 10/2010 | Shingleton et al. | 136/243 |
| 7,823,583 B2 * | 11/2010 | Allen et al. | 126/696 |
| 2003/0094193 A1 * | 5/2003 | Mapes et al. | 136/244 |
| 2003/0101662 A1 * | 6/2003 | Ullman | 52/27 |
| 2004/0128923 A1 | 7/2004 | Moulder et al. | |
| 2004/0221524 A1 | 11/2004 | Poddany et al. | |
| 2004/0250491 A1 | 12/2004 | Diaz et al. | |
| 2005/0229924 A1 * | 10/2005 | Luconi et al. | 126/696 |
| 2008/0230047 A1 * | 9/2008 | Shugar et al. | 126/569 |
| 2009/0133689 A1 * | 5/2009 | Conchy et al. | 126/684 |
| 2010/0077679 A1 * | 4/2010 | Sagayama | 52/173.3 |
| 2010/0175337 A1 * | 7/2010 | Mascolo et al. | 52/173.3 |
| 2010/0175338 A1 * | 7/2010 | Garcia Cors | 52/173.3 |
| 2011/0023387 A1 * | 2/2011 | Sweeney et al. | 52/167.4 |

FOREIGN PATENT DOCUMENTS

EP         39614 A2 * 11/1981
JP      04247669 A *  9/1992

* cited by examiner

*Primary Examiner* — Robert Canfield

(74) *Attorney, Agent, or Firm* — Dickstein Shapiro LLP

(57) ABSTRACT

A rooftop photovoltaic module mounting system includes a footer and a photovoltaic module mounting framework.

26 Claims, 11 Drawing Sheets

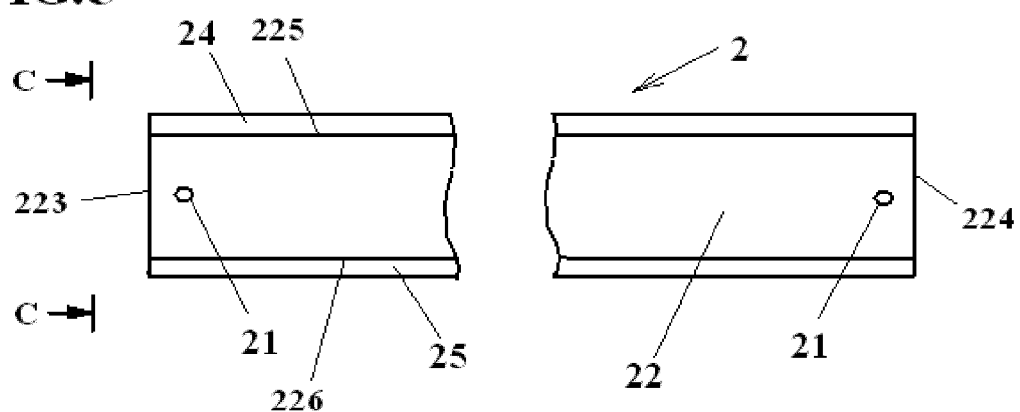
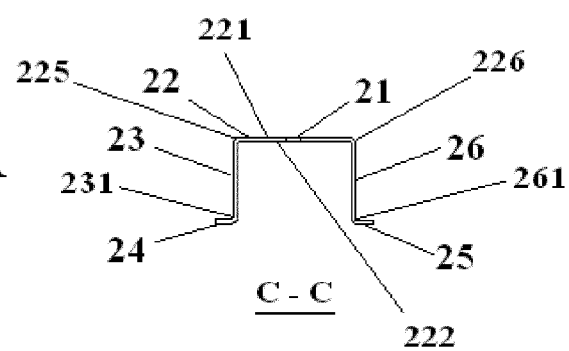

FIG. 8
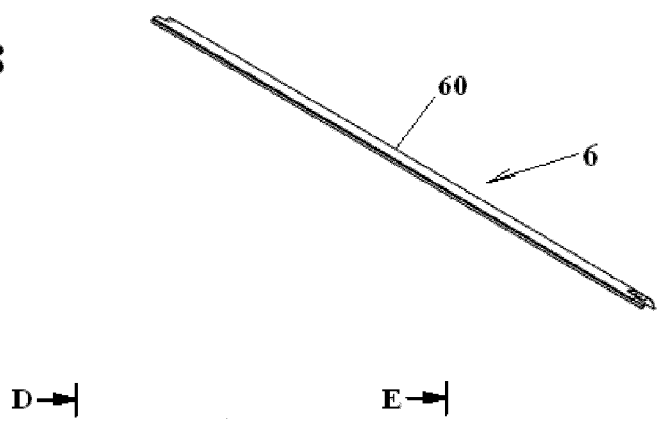
FIG. 9
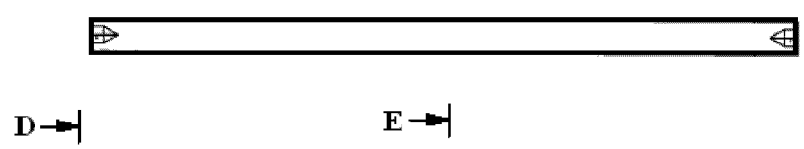
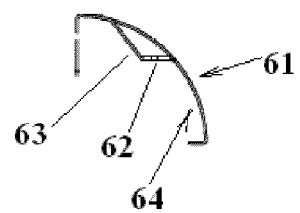
D - D
FIG. 9A
E - E
FIG. 9B

ROOFTOP PHOTOVOLTAIC MODULE MOUNTING SYSTEM

CLAIM OF PRIORITY

This application claims priority to U.S. Provisional Patent Application No. 61/159,222, filed on Mar. 11, 2009, which is incorporated by reference in its entirety.

TECHNICAL FIELD

This invention relates to a rooftop photovoltaic module mounting system.

BACKGROUND

Photovoltaic modules can be mounted to a mounting framework attached to a support structure, such as a roof, the ground, or a ground pad. The mounting framework can be installed on the support structure using a hardware connector (e.g., a screw, nail, rivet, weld, adhesive, or braze joint). The installation process can be time-consuming and complicated. Traditional approaches can makes rapid and safe removing or reconfiguration of a photovoltaic array challenging or expensive.

DESCRIPTION OF DRAWINGS

FIG. 5 is a top view of an embodiment of a rail of the rooftop photovoltaic module mounting system.

FIG. 5A is a cross-section view taken along line C-C in FIG. 5.

FIG. 8 is a perspective view of an embodiment of a wind deflector of the photovoltaic module mounting system.

FIG. 9 is a top view of the wind deflector of the rooftop photovoltaic module mounting system in FIG. 8.

FIG. 9A is a cross-section view taken along line D-D in FIG. 9.

FIG. 9B is a cross-section view taken along line E-E in FIG. 9.

DETAILED DESCRIPTION

Figure 1:
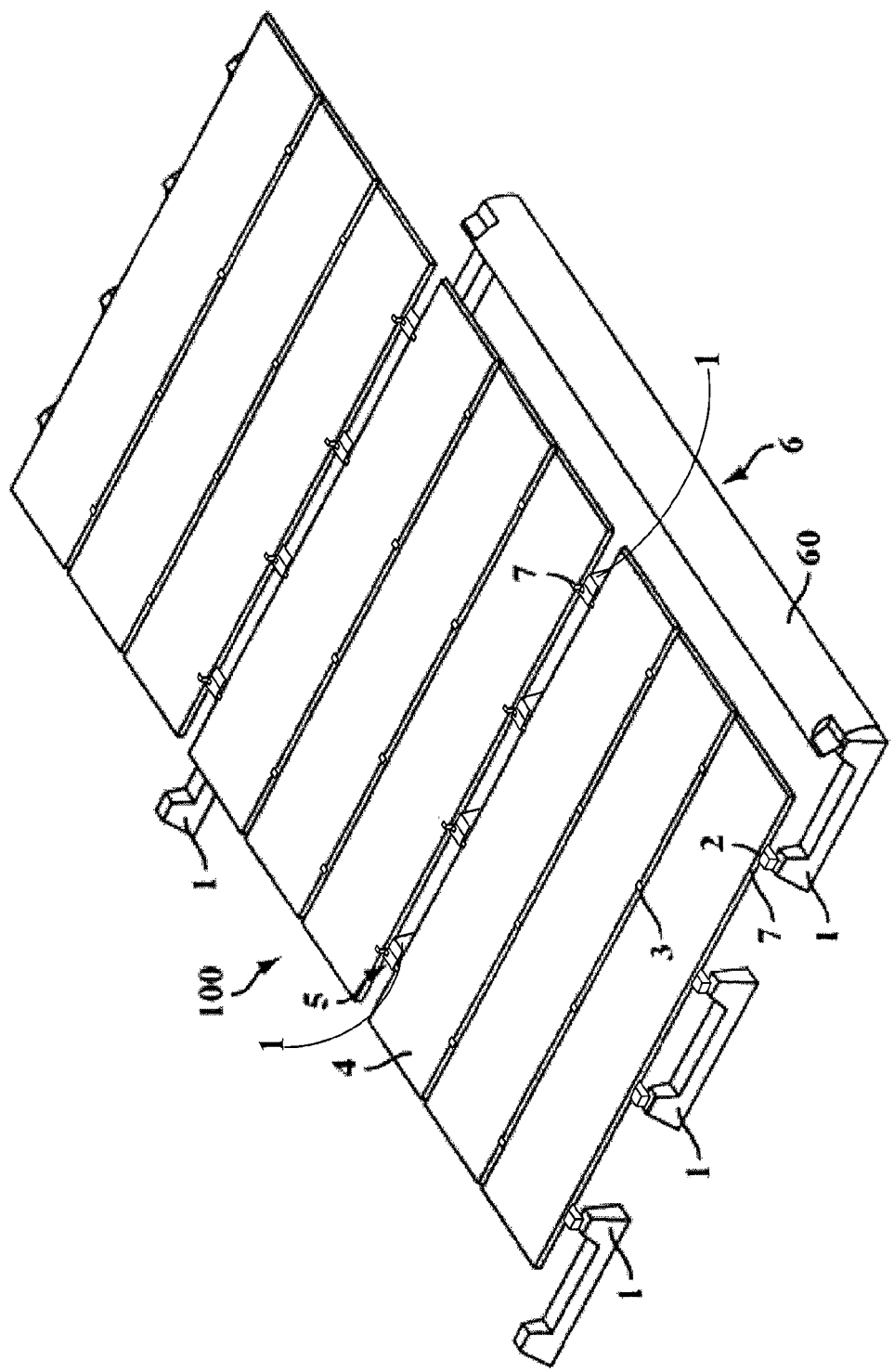
FIG. 1 is a perspective view of an embodiment of a rooftop photovoltaic module mounting system with plurality of mounted photovoltaic modules.

Photovoltaic modules generally are mounted to a mounting framework attached to a support structure, such as a roof, the ground, or a ground pad. Normally, the mounting framework is installed on the support structure using a hardware connector (e.g., a screw, nail, rivet, weld, adhesive, or braze joint). To make the mounting framework installation easier and more flexible, a rooftop photovoltaic module mounting system is developed without any hardware connection to the support structure.

In one aspect, a rooftop photovoltaic module mounting system may include a ballasted footer and a photovoltaic module mounting framework. The ballasted footer may include a rectangular base having a first end and a second end, a first mounting post adjacent to the first end of the rectangular base, and a second mounting post adjacent to the second end of the rectangular base. The photovoltaic module mounting framework may have two or more rails. Each rail can be attached to the first or second mounting post of the ballasted footer and configured to accommodate a hardware connector. The rooftop photovoltaic module mounting system may further include a wind deflector adjacent to the ballasted footer.

The wind deflector can have a curved panel or an arc-shaped panel. The arc-shaped panel of the wind deflector can have a radius of about 4 inches to about 10 inches. The wind deflector can include aluminum or steel. The wind deflector can be made of galvanized sheet. The ballasted footer can include concrete. The ballasted footer can include a ferrule loop insert. The ferrule loop insert can be electrically wire bonded. The rail of photovoltaic module mounting framework can include a rectangular top plate, a first side wall, a second side wall, a first base plate, and a second base plate. The rectangular top plate can have a top surface, a bottom surface, a first end, a second end, a first side edge, and a second side edge. The first side wall can extend from the first side edge of the top plate and perpendicular to the top plate. The first side wall can have a first terminal edge away from the bottom surface of the top plate. The second side wall can extend from the second side edge of the top plate and perpendicular to the top plate. The second side wall can have a second terminal edge away from the bottom surface of the top plate. The first base plate can extend from the first terminal edge of the first side wall and perpendicular to the first side wall. The second base plate can extend from the second terminal edge of the second side wall and perpendicular to the second side wall. The rail can be made of galvanized steel.

In another aspect, a rooftop photovoltaic array may include a ballasted footer, a photovoltaic module mounting framework having two or more rails, a wind deflector, a photovoltaic module mounting bracket attached to each rail, and a photovoltaic module attached the photovoltaic module mounting framework by the photovoltaic module mounting bracket. The ballasted footer may include a rectangular base having a first end and a second end, a first mounting post adjacent to the first end of the rectangular base, and a second mounting post adjacent to the second end of the rectangular base.

Each rail of the photovoltaic module mounting framework can be attached to the first or second mounting post of the ballasted footer and configured to accommodate a hardware connector. The wind deflector can have a curved panel or an arc-shaped panel. The arc-shaped panel of the wind deflector can have a radius of about 4 inches to about 10 inches. The wind deflector can include aluminum or steel. The wind deflector can be made of galvanized sheet. The ballasted footer can include concrete. The ballasted footer can include a ferrule loop insert.

The ferrule loop insert can be electrically wire bonded. The rail of photovoltaic module mounting framework can include a rectangular top plate, a first side wall, a second side wall, a first base plate, and a second base plate. The rectangular top plate can have a top surface, a bottom surface, a first end, a second end, a first side edge, and a second side edge. The first side wall can extend from the first side edge of the top plate and perpendicular to the top plate. The first side wall can have a first terminal edge away from the bottom surface of the top plate. The second side wall can extend from the second side edge of the top plate and perpendicular to the top plate. The second side wall can have a second terminal edge away from the bottom surface of the top plate. The first base plate can extend from the first terminal edge of the first side wall and perpendicular to the first side wall. The second base plate can extend from the second terminal edge of the second side wall and perpendicular to the second side wall. The rail can be made of galvanized steel.

In another aspect, a method of installing a photovoltaic array may include the steps of positioning a ballasted footer having a rectangular base having a first end and a second end, a first mounting post adjacent to the first end of the rectangular base, and a second mounting adjacent to the second end of the rectangular base on the rooftop, positioning two or more rails configured to accommodate a hardware connector adjacent to the ballasted footer and attaching each rail to the first or second mounting post of the ballasted footer, positioning a wind deflector adjacent to the ballasted footer, attaching two or more photovoltaic modules together with two or more photovoltaic module clips, mounting the photovoltaic modules to the rails using one or more photovoltaic module mounting brackets, and positioning a conduit between the modules and the ballasted footer.

The wind deflector can have a curved panel or an arc-shaped panel. The arc-shaped wind deflector panel can have a radius of about 4 inches to about 10 inches. The wind deflector can include aluminum or steel. The wind deflector can be made of galvanized sheet. The ballasted footer can include concrete. The ballasted footer can include a ferrule loop insert. The ferrule loop insert can be electrically wire bonded. The rail of photovoltaic module mounting framework can include a rectangular top plate, a first side wall, a second side wall, a first base plate, and a second base plate. The rectangular top plate can have a top surface, a bottom surface, a first end, a second end, a first side edge, and a second side edge. The first side wall can extend from the first side edge of the top plate and perpendicular to the top plate. The first side wall can have a first terminal edge away from the bottom surface of the top plate. The second side wall can extend from the second side edge of the top plate and perpendicular to the top plate. The second side wall can have a second terminal edge away from the bottom surface of the top plate. The first base plate can extend from the first terminal edge of the first side wall and perpendicular to the first side wall. The second base plate can extend from the second terminal edge of the second side wall and perpendicular to the second side wall. The rail can be made of galvanized steel.

In another aspect, a method of installing a photovoltaic array may include the steps of positioning plurality of ballasted footers in a staggered manner on the rooftop (each ballasted footer may have a rectangular base having a first end and a second end, a first mounting post adjacent to the first end of the rectangular base, and a second mounting adjacent to the second end of the rectangular base), positioning plurality of rails adjacent to the ballasted footers (each rail may be attached to the first or second mounting post of a ballasted footer and configured to accommodate a hardware connector), positioning plurality of wind deflectors adjacent to the ballasted footers (each wind deflector is attached two non-adjacent ballasted footers), attaching two or more photovoltaic modules together with two or more photovoltaic module clips, mounting the photovoltaic modules to the rails using one or more photovoltaic module mounting brackets, and positioning plurality of conduits between the modules and the ballasted footers. The ballasted footers may include concrete. The wind deflector may have an arc-shaped panel with a radius of about 4 inches to about 10 inches.

FIG. 1 shows a photovoltaic module mounting system 100 which can be mounted on a surface, such as a rooftop. Mounting system 100 includes ballasted footers 1 which are positioned on the rooftop in the hold of mounting system 100 and mounted photovoltaic modules 4 to provide support and enhance stability. Ballasted footers 1 can include a rectangular base and two mounting posts, with one mounting post at each end of the base. Ballasted footers 1 can be positioned on an area of a rooftop to define an area of mounting system 100. For example, ballasted footers 1 can be arranged in a pattern of rows and columns. FIG. 1 depicts a portion of mounting system 100 including three columns and five rows of ballasted footers 1, forming a partial mounting framework 5 for two rows of nine photovoltaic modules 4.

As shown in FIG. 1, a first column includes three ballasted footers 1 aligned with an end of wind deflector 6 and oriented end-to-end. Ballasted footers 1 in the first column can be spaced a distance which can be equal to the distance between the two mounting posts on a single ballasted footer 1. Ballasted footer 1 in the first column adjacent to wind deflector 6 includes a first mounting post to which a mounting point of wind deflector 6 is attached and a second mounting post to which a rail 2 is attached. Middle ballasted footer 1 in the first column shown in FIG. 1 has two mounting posts, each of which has another rail 2 attached. Ballasted footer 1 in the first column shown in FIG. 1 has a first mounting post closest to wind deflector 6, to which a rail 2 is attached and a second mounting post (not shown) which is unattached or which can be attached to another rail 2 or another wind deflector 6.

Figure 7:
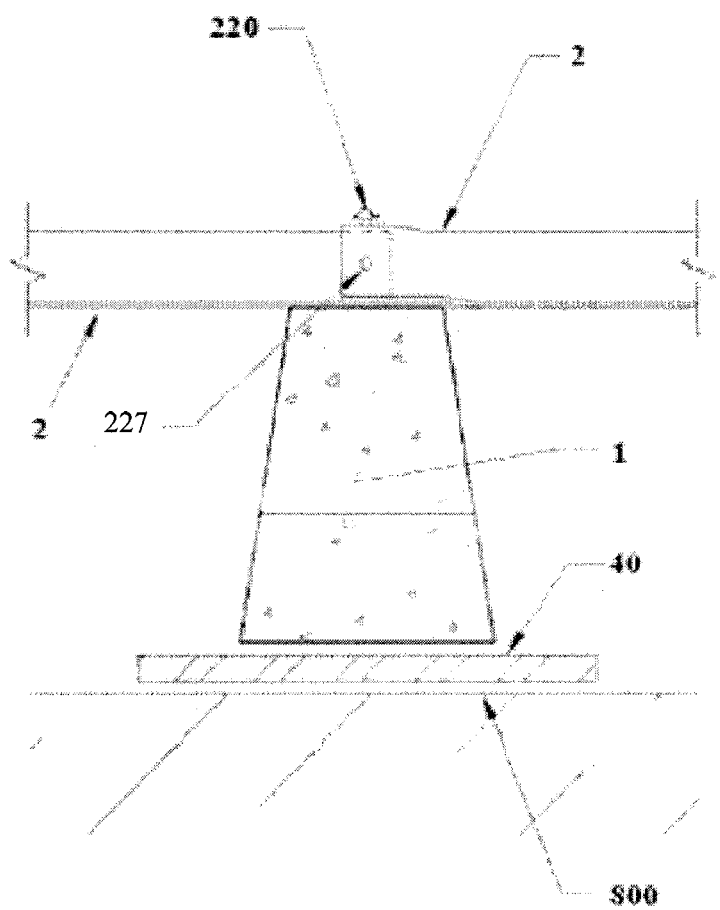
FIG. 7 is a profile view of a portion of a rooftop photovoltaic module mounting system.

Mounting system 100 shown in FIG. 1 includes a second column including two ballasted footers 1. Second-column ballasted footer 1 closer to wind deflector 6 includes two mounting posts. The first mounting post (closer to wind deflector 6) can be connected to rail 2 attached to the first-column ballasted footer 1 adjacent to wind deflector 6. The second mounting post can be connected to rail 2 attached to the middle first-column ballasted footer 1 (connected at the mounting post closer to wind deflector 6). Second-column ballasted footer 1 further from wind deflector 6 includes two mounting posts, with the first mounting post (closer to wind deflector 6) connected to rail 2 attached to the middle first-column ballasted footer 1 (connected at the mounting post further from wind deflector 6). The second mounting post can be connected to rail 2 attached to the first-column ballasted footer 1 furthest from wind deflector 6 (connected at the mounting post closer to wind deflector 6). In this manner, the second-column ballasted footers 1 can be staggered compared to first-column ballasted footers 1. (FIG. 7 shows mounting system 100 without modules 4 revealing staggered positioning of alternate columns of ballasted footers 1.)

Mounting system 100 showing in FIG. 1 includes a third column of three ballasted footers 1. The three third-column ballasted footers 1 are positioned such that the mounting posts in the third column can be aligned with the first-column mounting posts. For example, third-column ballasted footer 1 adjacent to wind deflector 6 includes a mounting post to which a mounting point of wind deflector 6 is attached. Rail 2 attached to the second mounting post of third-column ballasted footer 1 adjacent to wind deflector 6 is attached to the first-column ballasted footer 1 adjacent to wind deflector 6.

Ballasted footer 1 can be made of concrete, which can be precast to form ballasted footer 1 into a desired form. Ballasted footer 1 can be made of metal, such as aluminum. Ballasted footer 1 can be formed in any suitable manner, including by casting, forging, molding, stamping, or carving. Rails 2 forming photovoltaic module mounting framework 5 can be configured to be attached to ballasted footers 1 by any suitable means, including attaching to ferrule loop inserts included in the mounting posts of ballasted footers 1, or attaching a hardware connector, such as a rod, connected to ballasted footer 1, for example a threaded rod set in concrete cast to form ballasted footer 1. Rails 2 can be configured to position and secure photovoltaic modules 4 in an array. Rails 2 can include any suitable hardware connectors (e.g., a screw, nail, rivet, weld, adhesive, or braze joint). Photovoltaic modules 4 can be attached to photovoltaic module mounting framework 5 with mounting brackets 7 and mounting spacers 3. A mounting bracket 7 secures a portion of an edge of module 4 at a point where rail 2 attaches to a mounting post of a ballasted footer 1. Mounting bracket 7 can secure a portion of a single module 4 (as in the first column of ballasted footers 1 in FIG. 1) or can secure a portion of each of two modules 4 (as in the second column of ballasted footers 1 in FIG. 1). Mounting spacer 3 secures a portion of an edge of module 4 at a position on rail 2 not adjacent to a mounting post of a ballasted footer 1.

The columns and rows of positioned ballasted footers 1 (such as the three columns and five rows shown in FIG. 1) can form a staggered arrangement where each ballasted footer 1 in half the columns is attached to rails 2 supporting two rows of modules 4 and each ballasted footer 1 in the alternate columns is attached to rails 2 supporting a single row of modules 4. As shown in FIG. 1, the mounting posts of each ballasted footer 1 in the first column is positioned under two rows of modules and the mounting posts of each ballasted footer 1 in the second column is positioned under one row of module. Additional columns and rows of ballasted footers 1 can be added to the configuration shown in FIG. 1 to cover an area of a surface such as a rooftop.

Figure 2:
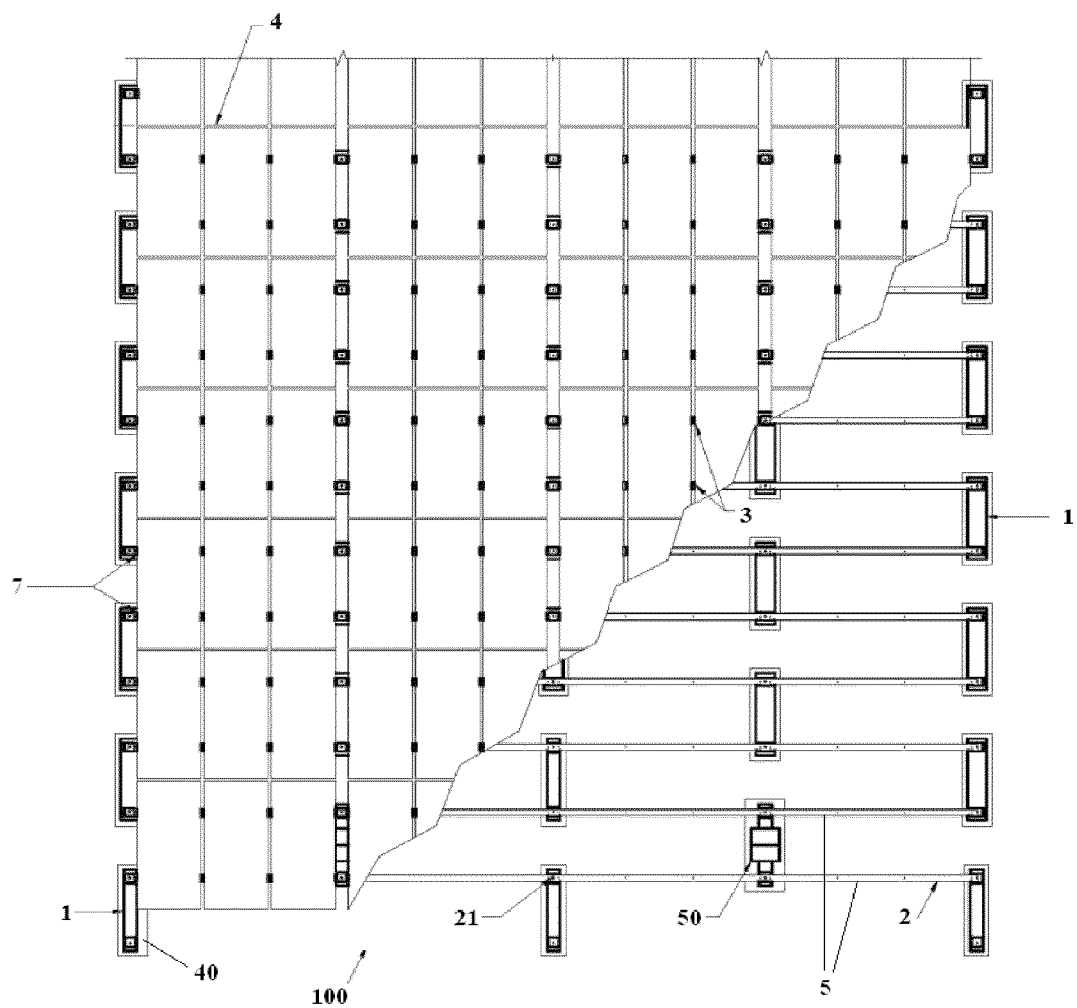
FIG. 2 is a top view of an embodiment of a rooftop photovoltaic module mounting system with plurality of mounted photovoltaic modules.

Referring to FIG. 2, a top view of mounting system 100 is shown. FIG. 2 shows the staggered positioning of ballasted footers 1. Ballasted footers 1 can have different sizes and shapes and can be made of different materials. For example, ballasted footers 1 located near the perimeter of mounting system 100 can be made of concrete and ballasted footers 1 in the interior portion of mounting system 100 can be a metal such as aluminum. Ballasted footers 1 can support rails 2 to form a mounting framework 5. Modules 4 are mounted on mounting framework 5. Modules can be connected to mounting framework 5 and/or each other by mounting brackets 7 and mounting spacers 3.

As shown in FIG. 2, mounting system 100 can include a roof protection pad 40 positioned between ballasted footer 1 and a roof surface. Roof protection pad 40 can include any suitable material, including metal, plastic, fibers or masonry. Roof protection pad 40 can be weather resistant and can be configured to be attached to ballasted footer 1.

Referring to FIG. 2, mounting system 100 can include ballast units 50. Ballast units 50 can be positioned adjacent to mounting system 100 to provide additional ballast. For example, ballast units 50 can be positioned between the mounting posts of ballasted footer 1. Ballast units 50 can be made of any suitable material, including concrete or a metal such as aluminum. Ballast units 50 can be formed in any suitable manner, including by casting, forging, molding, stamping, or carving. Ballast units 50 can be connected to mounting system 100. For example, a ballast unit 50 can be connected to ballasted footer 1.

Figure 3:
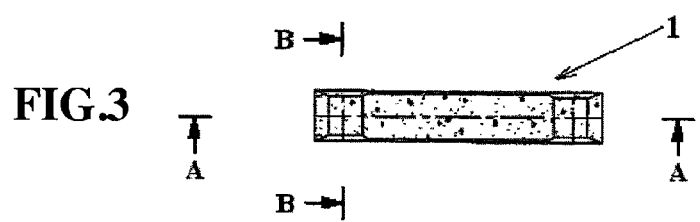
FIG. 3 is a top view of an embodiment of a ballasted footer of the rooftop photovoltaic module mounting system.
Figure 3A:
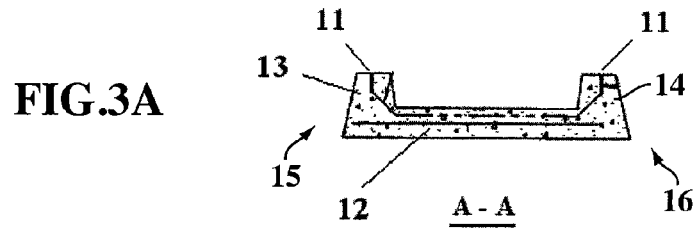
FIG. 3A is a cross-section view taken along line A-A in FIG. 3.
Figure 3B:
FIG. 3B is a cross-section view taken along line B-B in FIG. 3.

Referring to FIG. 3, a top view of ballasted footer 1 is depicted. Ballasted footer 1 can have a rectangular-shaped base. Ballasted footer 1 can provide a ballasting effect to a photovoltaic module mounting system 100 (FIG. 1) into which ballasted footer 1 is integrated. This ballasting effect can be provided through either the mass of the ballasted footer 1 itself or through ballasting by another unit, such as ballast unit 50 (FIG. 2). Ballasted footer 1 can be made of concrete, which can be precast to form ballasted footer 1 into a desired form. Referring to FIG. 3A, a cross section along line A-A in FIG. 2, is shown. Ballasted footer 1 shown in FIG. 3A has rectangular base 12. Ballasted footer 1 has first and second mounting posts 13, 14 formed at opposite ends 15, 16 of rectangular base 12. Referring to FIGS. 3A and 3B, a cross-section along line B-B, the mounting posts 13, 14 can include ferrule loop insert 11. Ferrule loop insert 11 can be electrically wire bonded. The mounting posts 13, 14 can include other attachment hardware, including a metal rod extending from a portion of mounting post 13. A portion of the metal rod can be threaded and can be set in the mounting posts 13, 14 or driven, screwed, or otherwise inserted into the mounting posts 13, 14.

Figure 4:
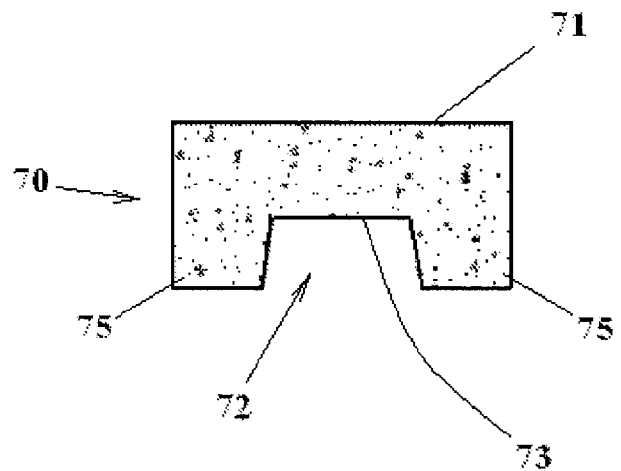
FIG. 4 is a profile view of an embodiment of an adder block of the rooftop photovoltaic module mounting system.
Figure 4A:
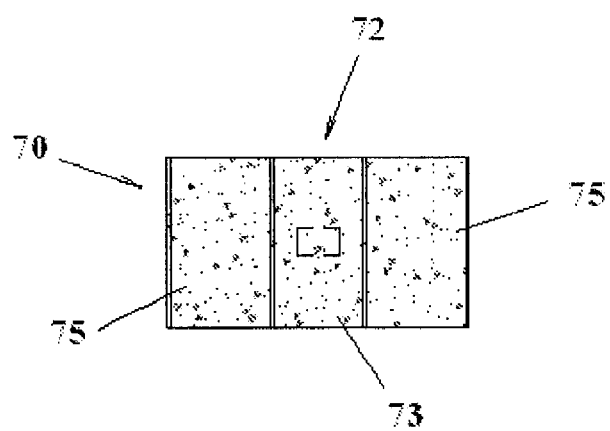
FIG. 4A is a bottom view of an embodiment of an adder block of the rooftop photovoltaic module mounting system.
Figure 4B:
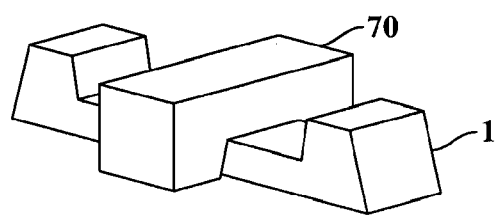
FIG. 4B is a perspective view of an embodiment of an adder block of the photovoltaic module mounting system positioned adjacent to a ballasted footer.

Referring to FIG. 4, a profile view of adder block 70 is shown. Adder block 70 can be used as a ballast unit to provide additional ballast to ballasted footer 1, similar to ballasted units 50 in FIG. 2. Adder block 70 can include a top surface 71 and a recess 72 opposite top surface 71. Recess 72 can be defined by bottom surface 73 in recess 72 and positioning posts 75. FIG. 4A is a bottom view of adder block 70, which shows that recess 72 can be defined by bottom surface 73 and positioning posts 75. Positioning posts 75 can help position adder block 70 adjacent to ballasted footer 1 to provide ballast. For example, adder block 70 can be positioned between the mounting posts of ballasted footer 1 as shown in FIG. 4B. Adder block 70 can be made of any suitable material, including concrete or a metal such as aluminum. Adder block 70 can be formed in any suitable manner, including by casting, forging, molding, stamping, or carving. Adder block 70 can be connected to mounting system 100. For example, adder block 70 can be connected to ballasted footer 1.

Referring to FIG. 5, a top view of rail 2 is depicted. Rail 2 includes rectangular top plate 22 having first end 223, second end 224, first side edge 225, second side edge 226, bottom surface 222, first base plate 24, and second base plate 25. Rail 2 can also include openings 21 which can accommodate a hardware connector (e.g., a screw, nail, rivet, weld, adhesive, or braze joint) used to connect rail 2 to a mounting post of a ballasted footer or to connect two rails 2 to each other. Openings 21 can also be provided to attach module 4 to rail 2. Referring to FIG. 5A an end view of rail 2 is shown. First side wall 23 extends downward, perpendicular from first side edge 225 of top surface 221, ending at first terminal edge 231. Second side wall 26 extends downward, perpendicular from second side edge 226, ending at second terminal edge 261.

First base plate 24 can extend from first terminal edge 231 of first side wall 23 and perpendicular to first side wall 23. Second base plate 25 can extend from second terminal edge 261 of second side wall 26 and perpendicular to second side wall 26. The resulting cross-section can be top hat-shaped. Rail 2 can be formed from any suitable material, including metal such as galvanized steel.

Figure 6:
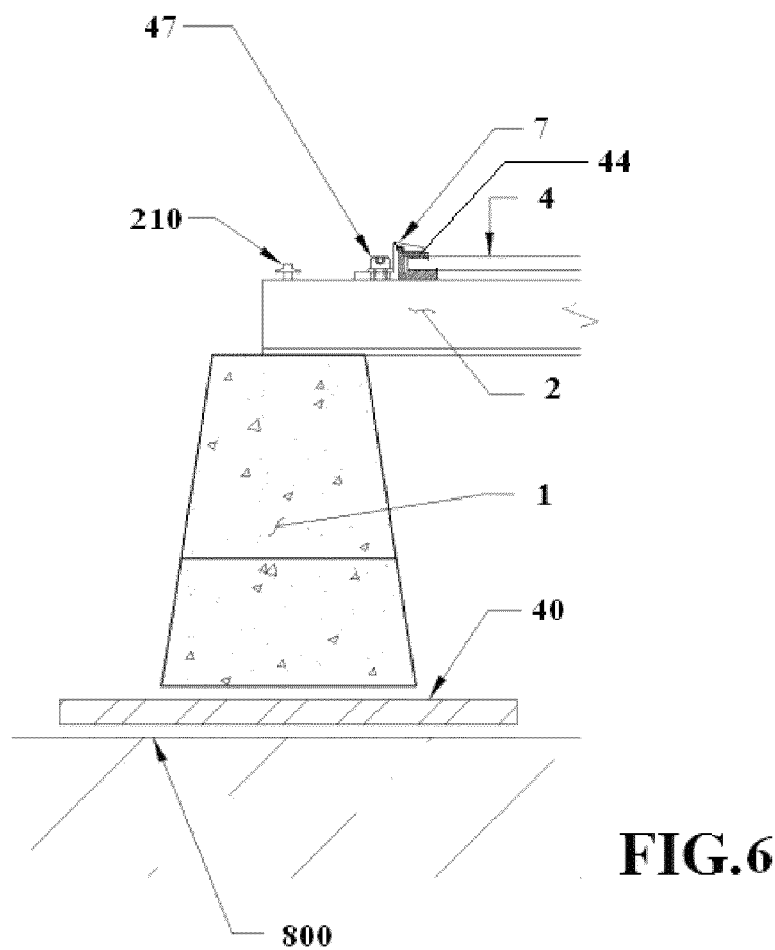
FIG. 6 is a profile view of a portion of a rooftop photovoltaic module mounting system.

Referring to FIG. 6, ballasted footer 1 is positioned adjacent to roof protection pad 40, which in turn can be positioned over roof 800. An end of rail 2 can be positioned adjacent to a mounting post of ballasted footer 1. Rail 2 can be connected to ballasted footer 1 with a hardware connector 210 (e.g., a screw, nail, rivet, weld, adhesive, or braze joint). As shown in FIG. 6, module 4 can be positioned adjacent to rail 2. Module 4 can include an edge encapsulation 44. A portion of module 4 (for example, a portion including edge encapsulation 44) can be positioned between a surface of rail 2 and a surface of mounting bracket 7 configured to position module 4. Mounting bracket 7 can be connected to rail 2 with a hardware connector 47 (e.g., a crew, nail, rivet, weld, adhesive, or braze joint).

Referring to FIG. 7, ballasted footer 1 is positioned adjacent to roof protection pad 40, which in turn can be positioned over roof 800. Ends of each of rails 2 are positioned adjacent to each other, adjacent to a mounting post of ballasted footer 1. Rails 2 can be connected to each other and one or both of rails 2 can be connected to the mounting post. Rails 2 can be connected with a hardware connector 220 (e.g., a screw, nail, rivet, weld, adhesive, or braze joint). Hardware connector 220 can connect the ends of rails 2 to one another and/or to the mounting post. A first rail 2 can be connected to a second rail 2 by inserting an end of the first rail into an end of the second rail. One or more of the ends can be shaped or reshaped to accommodate fitting one end into the other. For example, one or both ends can be swaged before inserting. A portion of hardware connector 220 can transverse a portion of each of rails 2 and/or a mounting post. For example, a bolt can be passed through a hole in one end of each of two rails, where the holes are aligned after a first end is inserted in a second end. The bolt can then be passed through the rails into a mounting post. Additional hardware connector 227 can be provided at an additional position to connect rails 2 and/or the mounting post.

Referring to FIG. 8, wind deflector can include wind deflector panel 60. FIG. 9 shows a top view of wind deflector 6. FIG. 9A shows an end view of wind deflector 6 through line D-D. Wind deflector 6 can have outer surface 61 and inner surface 64. Wind deflector 6 can further include support structure 63 attached to inner surface 64. Support structure 63 can include opening 62 configured to accommodate a hardware connector (e.g., a screw, nail, rivet, weld, adhesive, or braze joint). FIG. 9B shows a cross-section of wind deflector through line E-E. Wind deflector panel 60 can be a curved panel, an arc-shaped panel, or other aerodynamic shaped panel. Wind deflector 6 can be any suitable material, including metal, such as aluminum or steel. Wind deflector 6 can be made of galvanized sheet. Arc-shaped wind deflector panel 60 can have a radius of about 4 inches to about 10 inches, about 4.5 inches, or about 7.5 inches.

Figure 10:
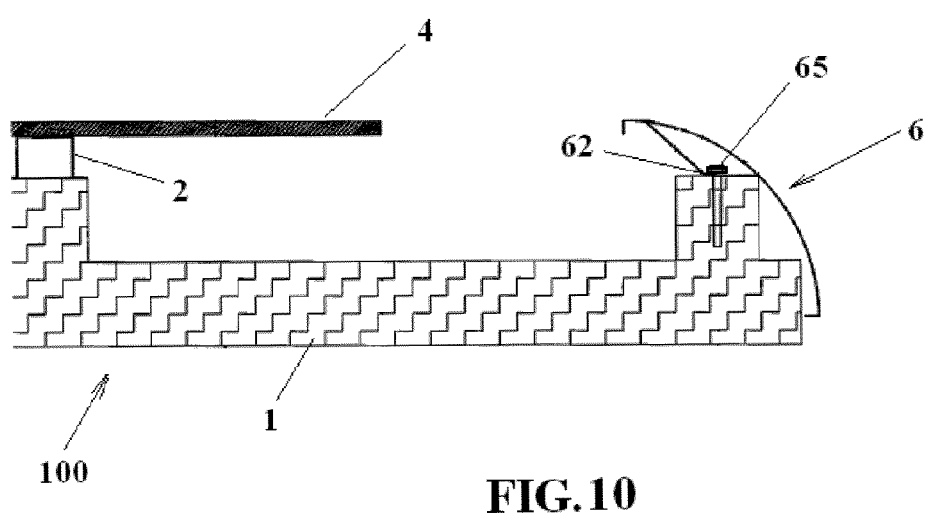
FIG. 10 is a partial cross-sectional view of an embodiment of a rooftop photovoltaic module mounting system with a mounted photovoltaic module.

Referring to FIG. 10, rooftop photovoltaic module mounting system 100 with mounted photovoltaic module 4 can include ballasted footer 1, rail 2, and wind deflector 6. Wind deflector 6 can be attached to ballasted footer 1 by hardware connector 65 (e.g., a screw, nail, rivet, weld, adhesive, or braze joint). As shown in FIG. 10, wind deflector 6 can direct wind or air flow around ballasted footer 1, rail 2, and wind deflector 6 to yield a stable structure. Moreover, with the help of wind deflector 6 to stabilize the structure, ballasted footer 1 can be made with less weight to achieve more efficient design and easier installation.

Figure 11:
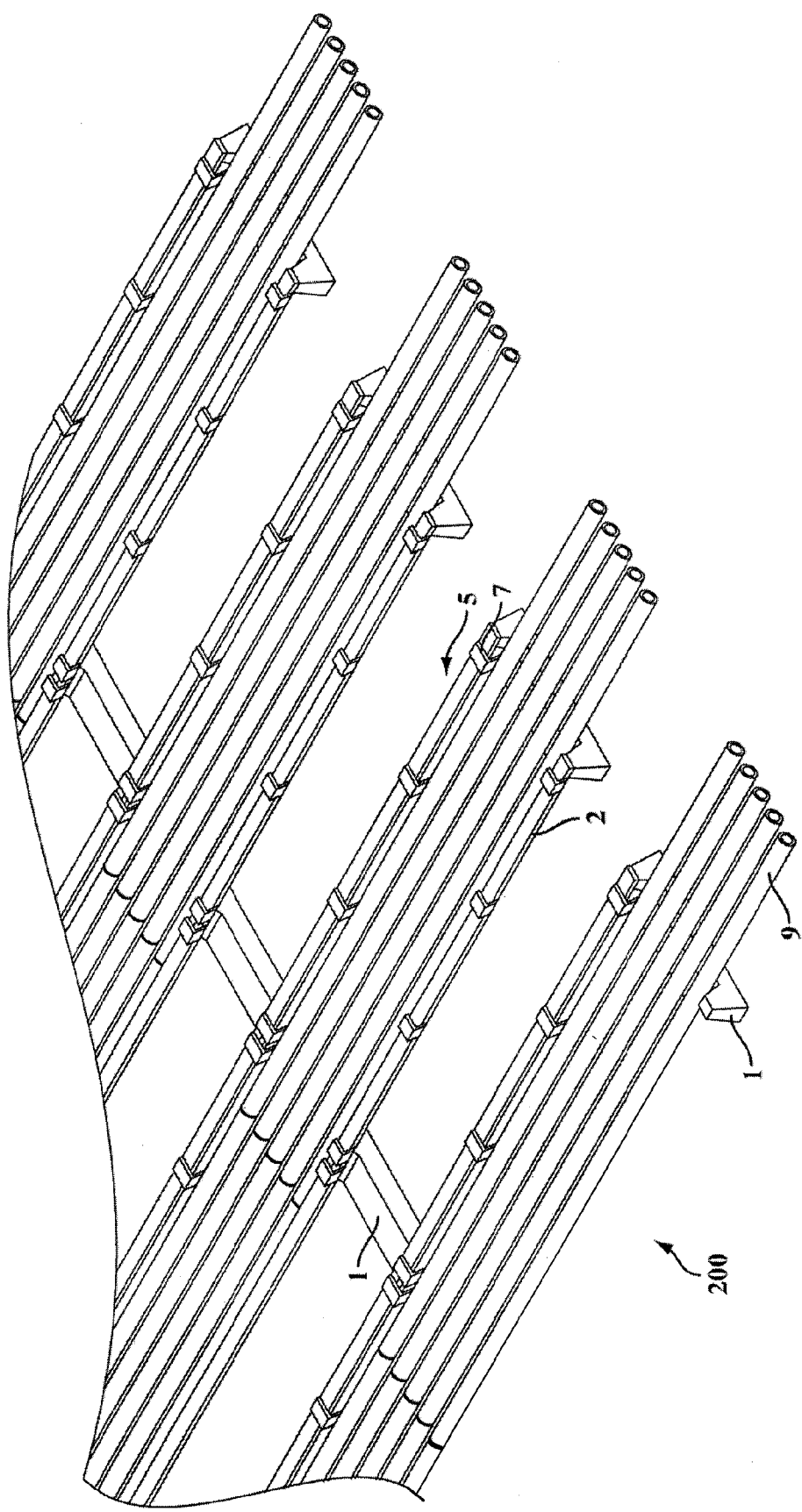
FIG. 11 is a perspective view of another embodiment of a rooftop photovoltaic module mounting system with plurality of mounted conduits.

Referring to FIG. 11, rooftop photovoltaic module mounting system 200 can include one or more ballasted footers 1 and photovoltaic module mounting framework 5. Ballasted footers 1 can be positioned in a staggered manner to be attached to wind deflector 6 (not shown in this figure). Photovoltaic module mounting framework 5 can include two or more rails 2. Each rail can be attached to the first or second mounting post of ballasted footer 1 and configured to accommodate a hardware connector (e.g., a screw, nail, rivet, weld, adhesive, or braze joint). Photovoltaic module mounting framework 5 can include two or more mounting brackets 7 attached to rail 2. Rooftop photovoltaic module mounting system 200 can include one or more conduits 9 (fewer conduits than 5 are not shown) mounted on ballasted footer 1. Conduits 9 can be tubes or ducts for enclosing the wires. Conduits 9 can be a purpose-designed electrical piping system used for protecting and routing of electrical wiring.

Figure 12:
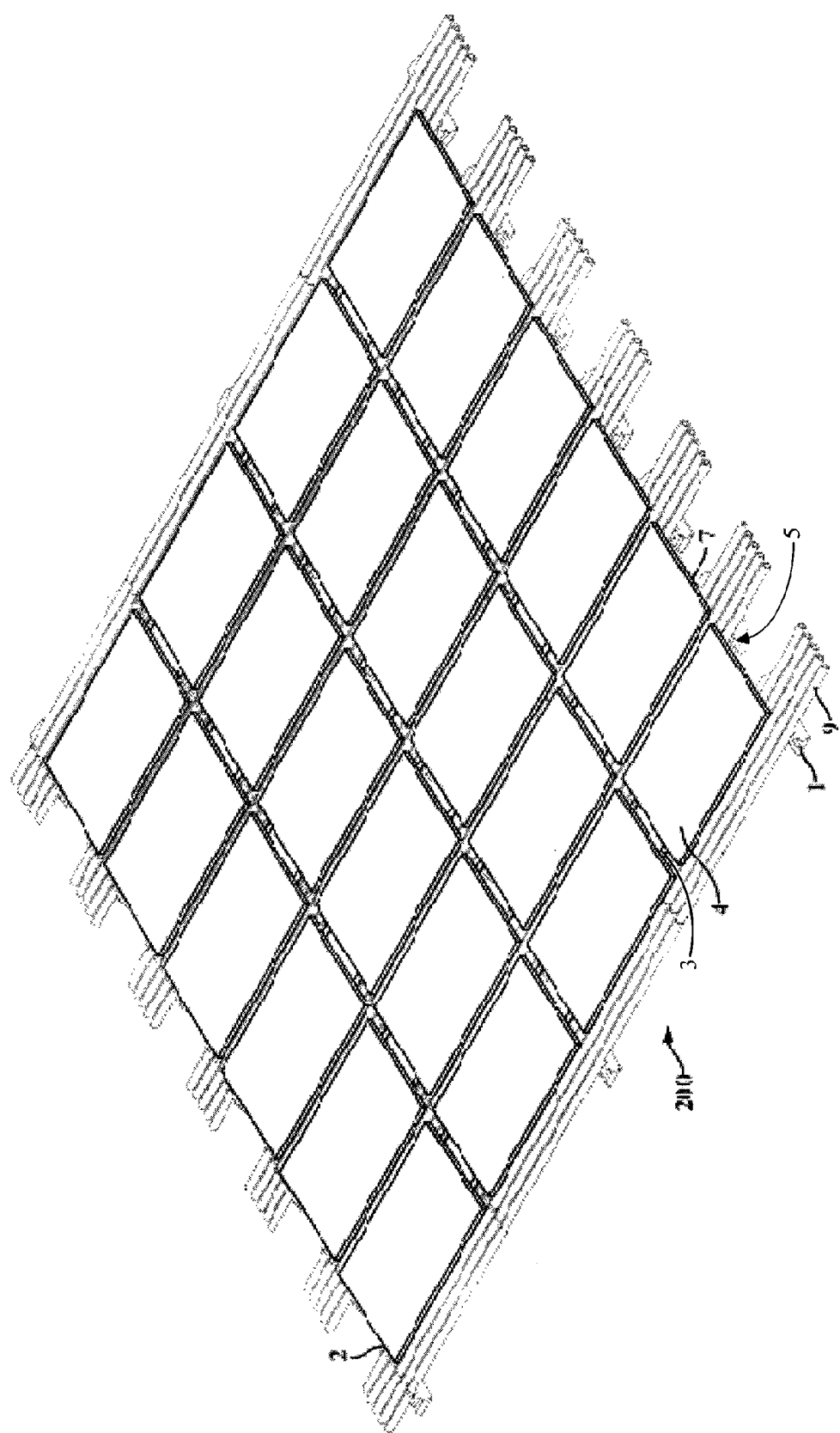
FIG. 12 is a perspective view of an embodiment of a rooftop photovoltaic module mounting system with plurality of mounted photovoltaic modules and conduits.

Referring to FIG. 12, rooftop photovoltaic module mounting system 200 with mounted photovoltaic modules 4 can include one or more ballasted footers 1 and photovoltaic module mounting framework 5. Photovoltaic module mounting framework 5 can include two or more rails 2. Each rail can be attached to the first or second mounting post of ballasted footer 1 and configured to accommodate a hardware connector (e.g., a screw, nail, rivet, weld, adhesive, or braze joint). Rooftop photovoltaic module mounting system 200 can include one or more conduits 9 mounted on ballasted footer 1. Photovoltaic modules 4 can be attached together by photovoltaic module clip 3.

A number of embodiments of the invention have been described. Nevertheless, it will be understood that various modifications may be made without departing from the spirit and scope of the invention. It should also be understood that the appended drawings are not necessarily to scale, presenting a somewhat simplified representation of various preferred features illustrative of the basic principles of the invention.

What is claimed is:

1. A rooftop photovoltaic module mounting system comprising:
   a first ballasted footer comprising a base having a longitudinal extent, a first end, and a second end, a first mounting post extending upwardly from the base adjacent to the first end of the base, and a second mounting post extending upwardly from the base adjacent to the second end, opposite the first end, of the base;
   a second ballasted footer spaced from said first ballasted footer and comprising a second base having a second longitudinal extent, a third end, and a fourth end, a third mounting post extending upwardly from the second base adjacent to the third end, and a fourth mounting post extending upwardly from the second base adjacent to the fourth end, opposite the third end; and
   a photovoltaic module mounting framework comprising a plurality of rails, a first rail of the plurality of rails being attached to a top surface of one of the first or second mounting posts of the first ballasted footer and attached to a top surface of one of the third or fourth mounting posts of the second ballasted footer.

2. The rooftop photovoltaic module mounting system of claim 1, wherein the system comprises a wind deflector adjacent to the first ballasted footer.

3. The rooftop photovoltaic module mounting system of claim 2, wherein the wind deflector comprises a curved panel or an arc-shaped panel.

4. The rooftop photovoltaic module mounting system of claim 3, wherein the wind deflector has a radius of about 4 inches to about 10 inches.

5. The rooftop photovoltaic module mounting system of claim 2, wherein the wind deflector comprises aluminum, steel or galvanized steel.

6. The rooftop photovoltaic module mounting system of claim 1, wherein the first ballasted footer comprises concrete.

7. The rooftop photovoltaic module mounting system of claim 1, wherein the first ballasted footer comprises a first ferrule loop insert.

8. The rooftop photovoltaic module mounting system of claim 7, wherein the second ballasted footer comprises a second ferrule loop insert and the first and second ferrule loop inserts are electrically wire bonded.

9. The rooftop photovoltaic module mounting system of claim 1, wherein the first rail comprises:
- a rectangular top plate having a top surface, a bottom surface, a first end, a second end, a first side edge, and a second side edge;
- a first side wall extending from the first side edge of the top plate and perpendicular to the top plate, comprising a first terminal edge away from the bottom surface of the top plate;
- a second side wall extending from the second side edge of the top plate and perpendicular to the top plate, comprising a second terminal edge away from the bottom surface of the top plate;
- a first base plate extending from the first terminal edge of the first side wall and perpendicular to the first side wall; and
- a second base plate extending from the second terminal edge of the second side wall and perpendicular to the second side wall.

10. The rooftop photovoltaic module mounting system of claim 1, wherein the first rail comprises galvanized steel.

11. The rooftop photovoltaic module mounting system of claim 1, further comprising:
- a wind deflector adjacent to the first ballasted footer;
- a photovoltaic module mounting bracket attached to each rail; and
- a photovoltaic module attached to the photovoltaic module mounting framework by the photovoltaic module mounting bracket.

12. The rooftop photovoltaic module mounting system of claim 11, wherein the wind deflector comprises a curved panel or an arc-shaped panel.

13. The rooftop photovoltaic module mounting system of claim 11, wherein the wind deflector has a radius of about 4 inches to about 10 inches.

14. The rooftop photovoltaic module mounting system of claim 11, wherein the wind deflector comprises aluminum, steel or galvanized steel.

15. The rooftop photovoltaic module mounting system of claim 11, wherein the first ballasted footer comprises concrete.

16. The rooftop photovoltaic module mounting system of claim 11, wherein the first ballasted footer comprises a first ferrule loop insert.

17. The rooftop photovoltaic module mounting system of claim 16, wherein the second ballasted footer comprises a second ferrule loop insert and the first and second ferrule loop inserts are electrically wire bonded.

18. The rooftop photovoltaic module mounting system of claim 11, wherein the array comprises conduits positioned between the module and the first ballasted footer.

19. The rooftop photovoltaic module mounting system of claim 11, wherein the first rail comprises galvanized steel.

20. The rooftop photovoltaic module mounting system of claim 11, wherein the first rail comprises:
- a rectangular top plate having a top surface, a bottom surface, a first end, a second end, a first side edge, and a second side edge;
- a first side wall extending from the first side edge of the top plate and perpendicular to the top plate, comprising a first terminal edge away from the bottom surface of the top plate;
- a second side wall extending from the second side edge of the top plate and perpendicular to the top plate, comprising a second terminal edge away from the bottom surface of the top plate;
- a first base plate extending from the first terminal edge of the first side wall and perpendicular to the first side wall; and
- a second base plate extending from the second terminal edge of the second side wall and perpendicular to the second side wall.

21. The rooftop photovoltaic module mounting system of claim 1, wherein a second rail of the plurality of rails is attached to a top surface of the other of the third and fourth mounting posts.

22. The rooftop photovoltaic module mounting system of claim 1, wherein the base, first mounting post, and second mounting post form a one-piece integral unit.

23. The rooftop photovoltaic module mounting system of claim 1, wherein the first ballasted footer has a rectangular shape with the longitudinal extent and a width, wherein the longitudinal extent is longer than the width.

24. A rooftop photovoltaic module mounting system comprising:
- a plurality of ballasted footers configured into rows and columns of ballasted footers,
  - wherein each ballasted footer comprises a base having a first end and a second end, a first mounting post extending upwardly from the base adjacent to the first end of the base, and a second mounting post extending upwardly from the base adjacent to the second end of the base; and
- a photovoltaic module mounting framework comprising a plurality of rails, at least one rail being attached to a top surface of at least one of the first and second mounting posts of at least two ballasted footers of the plurality of ballasted footers.

25. The rooftop photovoltaic module mounting system of claim 24, wherein the ballasted footers are configured in rows and columns in a staggered formation such that the first mounting post of a first ballasted footer of a first column supports a first rail of the plurality of rails and the second mounting post of a second ballasted footer in an adjacent second column supports the first rail of the plurality of rails.

26. A rooftop photovoltaic module mounting system comprising:
- a ballasted footer comprising a base having a longitudinal extent, a first end, and a second end, a first mounting post extending upwardly from the base adjacent to the first end of the base, and a second mounting post extending upwardly from the base adjacent to the second end, opposite the first end, of the base;
- a photovoltaic module mounting framework comprising a plurality of rails, at least one of said rails being attached to a top surface of one of the first or second mounting posts of the ballasted footer
- at least one adder block positioned adjacent to the ballasted footer to provide additional ballast to the ballasted footer.

* * * * *